(No Model.) 2 Sheets—Sheet 1.
P. LAFLIN.
SPINDLE FOR SPOOLING MACHINES, &c.
No. 282,331. Patented July 31, 1883.
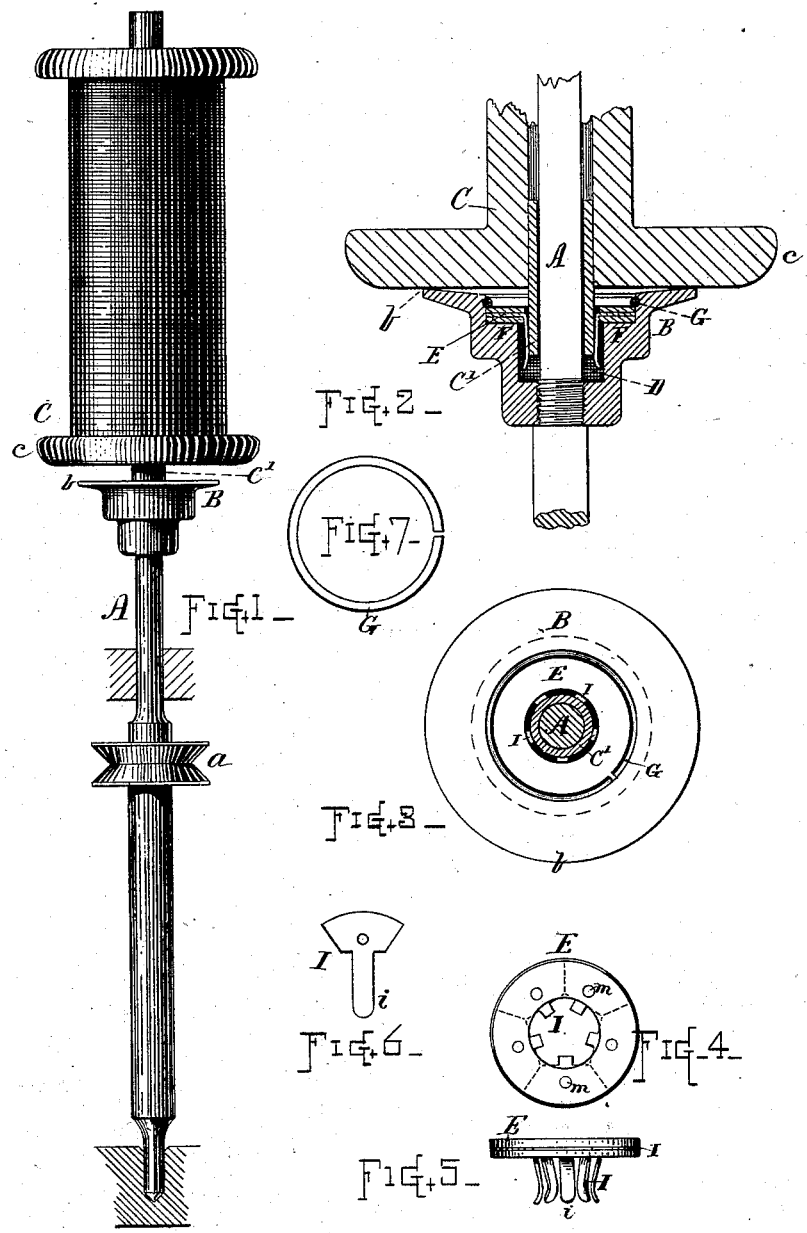

(No Model.) 2 Sheets—Sheet 2.
P. LAFLIN.
SPINDLE FOR SPOOLING MACHINES, &c.
No. 282,331. Patented July 31, 1883.
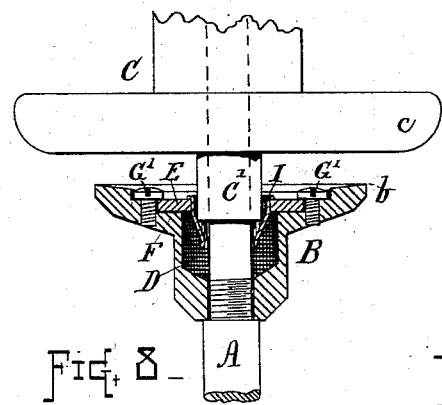
Fig. 8.
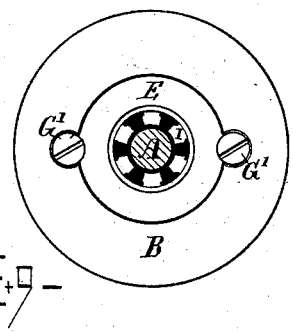
Fig. 9.
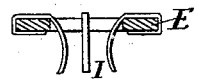
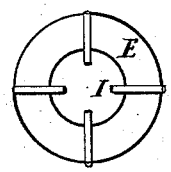
Figs. 10 & 11.
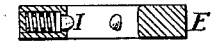
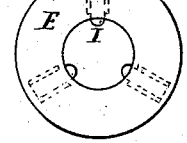
Figs. 12 & 13.
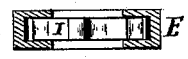
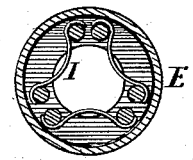
Figs. 15 & 14.
Witnesses
W. F. Burleigh
S. R. Paxton
Inventor
Perley Laflin
By Chas. H. Burleigh
Atty.

UNITED STATES PATENT OFFICE.

PERLEY LAFLIN, OF WARREN, ASSIGNOR TO THE WRIGHT MACHINE COMPANY, OF WORCESTER, MASSACHUSETTS.

SPINDLE FOR SPOOLING-MACHINES, &c.

SPECIFICATION forming part of Letters Patent No. 282,331, dated July 31, 1883.

Application filed December 26, 1882. (No model.)

*To all whom it may concern:*

Be it known that I, PERLEY LAFLIN, of Warren, in the county of Worcester and State of Massachusetts, have invented certain new and useful Improvements in Spindles for Spooling, Twisting, and other Similar Machines; and I declare the following to be a description of my said invention sufficiently full, clear, and exact to enable others skilled in the art to which it appertains to make and use the same, reference being had to the accompanying drawings, which form a part of this specification.

The object of my present invention is to provide a device for supporting a spool or bobbin on a spindle when raised from the friction-collar or carrying devices, to allow the spool to remain stationary while the spindle is in continuous motion, for facilitating the splicing of broken threads without the necessity of holding the spool by hand or stopping the machine; also, to provide a device that will retain the spool or bobbin when pressed down upon the friction-collar or carrying device, and prevent it from jumping or becoming raised from said collar by the draft of the thread or by the jar and vibration of the machinery when in operation, thereby preserving a uniform degree of friction between the spool and collar and insuring the proper revolution of the spool. These objects I attain by mechanism such as illustrated in the accompanying drawings and herein described, the particular subject-matter claimed being hereinafter definitely specified.

In the drawings, Figure 1 represents in elevation a spindle, with its whirl and collar or carrier, with my improvement applied thereto, showing the spool supported away from the friction-collar or carrier, and the upper and lower rails in section. Fig. 2 represents a vertical section of a friction-collar containing my improvement, and the lower end of the spool, showing the relative position of the parts in working order on the spindle, which is in elevation. Fig. 3 is a plan view of the friction-collar or spool-carrier. Fig. 4 is a plan view of the loose washer or ring-plate and clutch-springs separate from the collar. Fig. 5 is a side view of the same. Fig. 6 is a view of one of the spring-blanks. Fig. 7 is a view of the retaining-ring. Fig. 8 is a vertical section of the friction-collar, and devices illustrating a modification in construction, wherein the springs are formed by a split thimble or ferrule secured within the washer-ring, the spool and spindle being in elevation. Fig. 9 is a plan view of the same. Figs. 10 and 11 show a modified form of washer with springs formed of wire. Figs. 12 and 13 show a modification in which studs with spiral springs are employed for clutching the spool. Figs. 14 and 15 show a modification in which the springs are flat or of elliptical form, with their ends retained by studs and their centers adapted for sustaining the spool.

In reference to parts, A denotes the spindle, of any suitable form, provided with a band-whirl, $a$, and to be properly mounted on the frame of the machine for operation in the ordinary manner.

B indicates the collar or carrier, upon which the spool C is supported and revolved by the friction of the edge or rim $b$ against its head or flange $c$. Said collar is screwed upon or otherwise rigidly secured to the spindle A and forms a part of the spindle mechanism.

The interior of the collar B is hollowed out, forming a chamber, D, for the reception of a washer, center ring, or annular plate, E, which surrounds the hub or journal C′ of the spool C, and rests upon a shoulder, F, near the upper part of the recess or chamber D, where it is retained by means of a wire ring, G, or other suitable means, in such manner that it can revolve freely within its recess independently of the revolutions of the collar B, to which it is retained against upward or downward independent movement by the said ring G and shoulder F.

The washer or ring-plate E is provided with a series of springs or clutching devices, I, arranged about the central opening, and adapted to engage the hub or journal C′ of the spool C, at its sides or beneath its end, with sufficient force to retain the spool at any position of adjustment, either at a position somewhat elevated from the collar, as in Figs. 1 and 8, or with the spool-head $c$ resting on the rim $b$ of the collar B.

The results attained by the construction are that the spool can be relieved from the friction or draft of the carriers or collar B, when desired, by simply raising it slightly on the spindle, as indicated in Fig. 1, when the weight of the spool will be supported by the ring-piece E and springs I, and in which position the motion of the spindle has but little tendency to rotate the spool, as the ring or washer E runs freely within the recess D, the spool being released and left free to be turned backward or otherwise manipulated at will by the attendant, thus obviating the necessity of holding the spool with one hand or stopping the machine while splicing broken threads, picking up lost ends, or winding off snarled meshes. The springs or clutches I also serve to retain the spool in contact with the rim b of the collar B when the spool is pressed down to its working position, thus insuring a uniform friction and draft, so that the thread or yarn will be wound regularly and closely onto the spool, and a more uniform wind given throughout the length of the strands.

The springs or thimble E I, by embracing the journal C' of the spool C, retains the lower end thereof coincident with the axis of the spindle, and thus prevents vibration of the spool on the spindle, and the consequent unequal wear of the spool-bushings into the surface of the spindle, as frequently occurs in machines of ordinary construction.

From the foregoing description it will readily be perceived by those conversant with the operation and use of spooling and twisting machines that my invention is of great service and practical utility, since by its employment and operation much less labor and trouble are required in the attendance on the machines, while it produces a much better class of work, and avoids making waste in the process of twisting and spooling yarn and thread.

The ring-piece E and springs I are preferably made, as illustrated in Figs. 5 and 6, by punching blanks, of the form shown in Fig. 6, from thin sheet metal, bending the tongues i downward, then arranging a series of these pieces between two annular disks, riveting the parts together, as at m, and properly finishing off the surfaces and edges.

Other modifications of construction are shown in Figs. 8 to 15, inclusive—such as, for instance, forming the springs I from a split or slotted thimble, as in Figs. 8 and 9, making the springs of wire, as in Figs. 10 and 11, or by inserting small round pointed studs in the body of the washer E, and providing spiral springs for forcing them inward against the hub of the spool C', as in Figs. 12 and 13, or, again, by providing small elliptical springs within the washer, as in Figs. 14 and 15, the bows of which extend into the opening and press against the sides of the spool-journal C'. The washer can also, if desired, be retained within the collar by means of screws G' in lieu of the wire ring G; but I prefer the construction shown in Fig. 2, as it gives a neater and more desirable finish.

What I claim as of my invention, and desire to secure by Letters Patent, is—

1. The combination, with the spindle and carrier or draft-collar, of an independently-revoluble supporter adapted for sustaining the spool raised from action or contact with its carrier or draft-collar, substantially as hereinbefore set forth.

2. The combination, with a spindle having a friction-collar or spool-carrier, of independently-revoluble devices adapted for sustaining the spool at a position of temporary adjustment above said collar or carrier and relieving the friction or draft, substantially as and for the purpose set forth.

3. The combination, with a spindle having a friction-collar or spool-carrier, of a loose ring or washer provided with springs for retaining the spool, with its head or flange, in contact with the friction-surface of said collar, or at a slight distance away from said surface, for the purposes set forth.

4. The combination, with a spindle having a friction-collar or spool-carrier, of an annular plate or washer supported to revolve freely within a chamber or recess formed in said collar, and provided with means for retaining a spool in slightly-elevated position and preventing friction of the spool-head on the friction-rim of said collar, substantially as set forth.

5. The combination, with the spindle and friction-collar or spool-carrier, of a ring-plate or washer revoluble within said collar, and provided with devices for retaining the hub of a spool, and means for retaining said ring-plate or washer within the recess of the collar, as set forth.

6. The combination, substantially as described, of the spindle A, the collar B, having chamber D, the revoluble ring-piece or washer E, provided with springs I, for engaging the hub of the spool, and the retaining-ring G, for the purposes set forth.

7. The combination of the recessed collar B, the loosely-revoluble ring-piece E, and the springs I, as set forth.

8. The ring-piece E, composed of two annular plates, and the springs I i, retained between said plates by rivets m, as and for the purpose set forth.

Witness my hand this 19th day of October, A. D. 1882.

<div style="text-align:center">
PERLEY $\overset{\text{his}}{\times}$ LAFLIN.<br>
mark.
</div>

Witnesses:
  CHAS. H. BURLEIGH,
  J. WALTER SMITH.